United States Patent
Horiuchi et al.

(10) Patent No.: US 11,718,007 B2
(45) Date of Patent: Aug. 8, 2023

(54) STATE DETERMINATION DEVICE AND STATE DETERMINATION METHOD

(71) Applicant: FANUC Corporation, Yamanashi (JP)

(72) Inventors: Atsushi Horiuchi, Yamanashi (JP); Hiroyasu Asaoka, Yamanashi (JP); Kenjirou Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 844 days.

(21) Appl. No.: 16/561,017

(22) Filed: Sep. 5, 2019

(65) Prior Publication Data

US 2020/0101650 A1  Apr. 2, 2020

(30) Foreign Application Priority Data

Sep. 28, 2018  (JP) .................. 2018-185852

(51) Int. Cl.
  *B29C 45/76* (2006.01)
  *G05B 13/02* (2006.01)

(52) U.S. Cl.
  CPC ........ *B29C 45/768* (2013.01); *G05B 13/0265* (2013.01); *B29C 2945/76163* (2013.01)

(58) Field of Classification Search
  CPC .......... G05B 2219/45244; B29C 45/76; B29C 44/60; B29C 41/52; B29C 39/44; B29C 37/0096; B29C 2037/093; B29C 2037/90; B29C 45/768; B29C 2045/764; B29C 2045/5032; B29C 2045/1795; B29C 2043/585; B29C 2045/848; B29C 45/844; B29C 45/842; B29C 45/84
  See application file for complete search history.

(56) References Cited

U.S. PATENT DOCUMENTS

| 5,153,149 A | 10/1992 | Naito et al. |
| 2012/0123583 A1* | 5/2012 | Hazen ................... G05B 15/02 700/109 |
| 2014/0370139 A1 | 12/2014 | Horiuchi |
| 2017/0028593 A1 | 2/2017 | Maruyama |
| 2017/0031330 A1* | 2/2017 | Shiraishi ............. G05B 19/042 |
| 2017/0326771 A1 | 11/2017 | Uchiyama |
| 2018/0126558 A1 | 5/2018 | Ooba |
| 2018/0181694 A1 | 6/2018 | Springer et al. |
| 2020/0089202 A1 | 3/2020 | Horiuchi et al. |

FOREIGN PATENT DOCUMENTS

| CN | 102909844 A | 2/2013 |
| CN | 105574587 A | 5/2016 |
| CN | 108237670 A | 7/2018 |
| DE | 102019124483 A1 | 5/2020 |
| EP | 0897786 A2 | 2/1999 |

(Continued)

*Primary Examiner* — Stella K Yi
(74) *Attorney, Agent, or Firm* — Hauptman Ham, LLP

(57) ABSTRACT

A state determination device is capable of assisting maintenance for various injection molding machines. The state determination device acquires data related to an injection molding machine, performs numeric conversion for extracting a feature in a temporal direction or an amplitude direction, with respect to time-series data of physical quantity in the acquired data, and performs machine learning using the data obtained through numeric conversion so as to generate a learning model.

11 Claims, 8 Drawing Sheets

(56) References Cited

FOREIGN PATENT DOCUMENTS

| | | |
|---|---|---|
| JP | H1-168421 A | 7/1989 |
| JP | H469225 A | 3/1992 |
| JP | H10328808 A | 12/1998 |
| JP | 200052396 A | 2/2000 |
| JP | 201328002 A | 2/2013 |
| JP | 201382181 A | 5/2013 |
| JP | 2014-104689 A | 6/2014 |
| JP | 2015482 A | 1/2015 |
| JP | 2017-30221 A | 2/2017 |
| JP | 2017-202632 A | 11/2017 |
| JP | 201858178 A | 4/2018 |

* cited by examiner

FIG.4
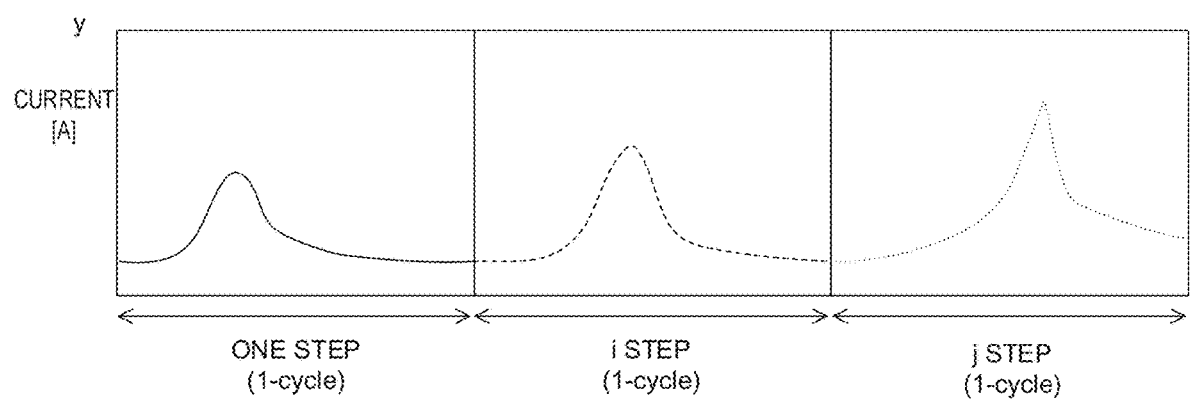
DIFFERENTIATION
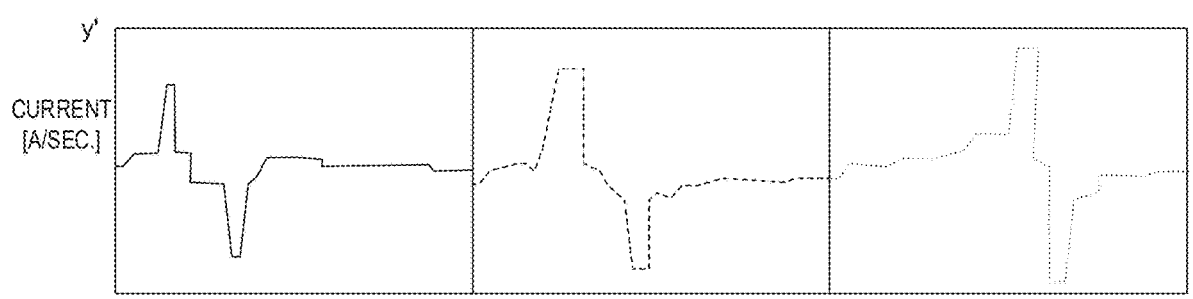

FIG.6
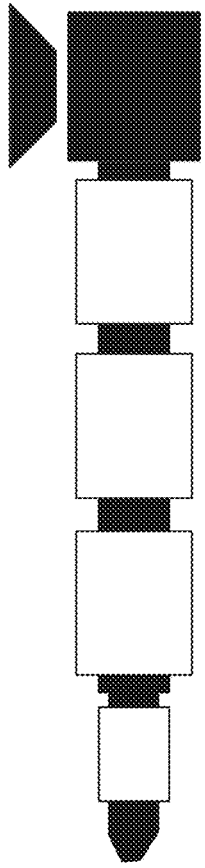
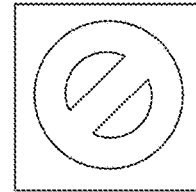

FIG.8

| DATA TYPE | NUMERIC CONVERSION |
|---|---|
| MOTOR CURRENT | CONVERSION PERFORMED: NORMALIZATION |
| INJECTION PRESSURE | CONVERSION PERFORMED: DIFFERENTIATION, NORMALIZATION |
| NOZZLE TEMPERATURE | NO CONVERSION |
| MOTOR VELOCITY | CONVERSION PERFORMED: DIFFERENTIATION |
| ... | ... |

STATE DETERMINATION DEVICE AND STATE DETERMINATION METHOD

RELATED APPLICATIONS

The present application claims priority to Japanese Patent Application Number 2018-185852 filed Sep. 28, 2018, the disclosure of which is hereby incorporated by reference herein in its entirety.

BACKGROUND OF THE INVENTION

1. Field of the Invention

The present invention relates to a state determination device and a state determination method and especially relates to a state determination device and a state determination method for assisting maintenance for injection molding machines.

2. Description of the Related Art

Industrial machines such as an injection molding machine are maintained regularly or when an abnormality occurs. In maintenance of an industrial machine, a maintenance staff determines whether an operation state of the industrial machine is normal or abnormal by using physical quantity, which represents operation states of the industrial machine that are preliminarily recorded in operation of the industrial machine, and thus performs maintenance work such as exchange of a part on which an abnormality occurs.

For example, as maintenance work for a check ring of an injection cylinder included in an injection molding machine, a method is known in which a screw is regularly taken out from the injection cylinder to directly measure the dimension of the check ring. However, production has to be temporarily stopped to perform the measurement operation in this method, thus disadvantageously lowering productivity.

As prior art techniques for solving such a problem, techniques are known in which a rotation torque applied on a screw is detected and a back-flow phenomenon in which resin flows toward the back of the screw is detected so as to indirectly detect a wear amount of a check ring of an injection cylinder and diagnose an abnormality without temporarily stopping production such as taking out a screw from the injection cylinder. For example, Japanese Patent Application Laid-Open No. 01-168421 discloses a technique in which a rotation torque acting on a screw rotation direction is measured and abnormality is determined when the rotation torque is not in an allowable range. Further, Japanese Patent Application Laid-Open No. 2014-104689 discloses a technique in which an actual measurement stress difference obtained through actual measurement is compared with an allowable error so as to determine whether maintenance and inspection are needed or not. Furthermore, Japanese Patent Application Laid-Open No. 2017-030221 and Japanese Patent Application Laid-Open No. 2017-202632 disclose techniques for diagnosing abnormality through supervised learning on a load on a driving unit, a resin pressure, and the like.

However, the above-described techniques disclosed in Japanese Patent Application Laid-Open No. 01-168421 and Japanese Patent Application Laid-Open No. 2014-104689 have a problem in that an operation for adjusting allowable ranges used for determining abnormality is required for machines having different specifications such as a rated torque and inertia of a motor constituting a driving unit of an injection molding machine and a reduction ratio of a reduction gear.

Further, the above-described techniques disclosed in Japanese Patent Application Laid-Open No. 2017-030221 and Japanese Patent Application Laid-Open No. 2017-202632 have a problem in that divergence between measured values obtained from machines having different specifications of components constituting driving units of injection molding machines and numerical values of learning data inputted in machine learning is too large to perform correct diagnosis through machine learning. For example, measured values such as a load on a driving unit and a resin pressure which are obtained in operating a large injection molding machine are large, while measured values such as a load on a driving unit and a resin pressure which are obtained in operating a small injection molding machine are small. Therefore, there is a problem in that even when an abnormality degree is estimated by directly using measured values obtained in operating a small injection molding machine as learning data based on a learning model, which is obtained through machine learning performed by using measured values such as a load on a driving unit and a resin pressure which are obtained in operating a large injection molding machine as learning data, the abnormality degree cannot be correctly estimated due to an influence of difference among different specifications of injection molding machines.

Further, there is a problem in that if a kind of resin, which is a raw material of a molded article to be manufactured by an injection molding machine, and kinds of auxiliary equipment of the injection molding machine such as a die, a mold temperature adjusting machine, and a resin dryer are different from those in machine learning, measured values obtained from the injection molding machine vary due to the influence of the auxiliary equipment and accordingly, diagnosis through machine learning cannot be correctly performed.

It is known that various types of learning conditions are prepared as many as combinations of pieces of equipment, such as a power engine, a reduction gear, and a movable unit, constituting an injection molding machine and machine learning is performed when learning models of the machine learning are produced, so as to improve diagnosis accuracy of the machine learning. However, performing machine learning with various types of injection molding machines, resin, auxiliary equipment, and components requires a large cost. In addition to this, raw materials such as resin and workpieces need to be prepared when machines are operated, requiring large cost for raw materials used for acquiring learning data. Further, operations for acquiring learning data require much time. Thus, there is a problem in that learning data cannot be efficiently collected.

SUMMARY OF THE INVENTION

An object of the present invention is to provide a state determination device and a state determination method by which maintenance of various injection molding machines can be assisted without requiring a large amount of cost.

According to the present invention, an abnormality degree is estimated by inputting, in machine learning, learning data, which is derived by performing numeric conversion such as normalization and differentiation with respect to time-series physical quantity (current and speed, for example) acquired from a controller, as time-series physical quantity inputted in machine learning, and thereby the above-described problems are solved.

More specifically, estimation of an abnormality degree is implemented by applying learning data, which is obtained through numeric conversion performed so as to absorb difference among pieces of auxiliary equipment and types of machines, to machine learning even when pieces of auxiliary equipment of injection molding machines are mutually different and even when types of injection molding machines are mutually different, specifically, even when sizes of machines are different as a small size or a large size and even when components of injection molding machines such as injection apparatuses, mold clamping apparatuses, injection cylinders, screws, and power engines are mutually different.

Further, based on an abnormality degree obtained as an output of machine learning, means are provided for displaying a message or an icon expressing a state of an abnormality on a display device, for stopping an operation of a movable unit of a machine so as to secure safety of an operator when an abnormality degree is equal to or larger than a predetermined value, for slowing down a power engine that drives the movable unit so as to allow the movable unit to operate safely, and for limiting a driving torque of the power engine small.

A state determination device according to an aspect of the present invention determines an operation state of an injection molding machine, and includes: a data acquisition unit that acquires data related to the injection molding machine; a numeric conversion unit that performs numeric conversion for extracting a feature in a temporal direction or an amplitude direction, with respect to time-series data of physical quantity included in data which is related to the injection molding machine and is acquired by the data acquisition unit; and a learning unit that performs machine learning using data, which is obtained through numeric conversion performed by the numeric conversion unit, and generates a learning model.

A state determination device according to another aspect of the present invention determines an operation state of an injection molding machine, and includes: a data acquisition unit that acquires data related to the injection molding machine; a numeric conversion unit that performs numeric conversion for extracting a feature in a temporal direction or an amplitude direction, with respect to time-series data of physical quantity included in data which is related to the injection molding machine and is acquired by the data acquisition unit; a learning model storage unit that stores a learning model, which is obtained by performing machine learning with respect to time-series data of physical quantity included in data related to the injection molding machine, based on data obtained by extracting a feature in a temporal direction or an amplitude direction; and an estimation unit that performs estimation using the learning model stored in the learning model storage unit, based on data obtained through numeric conversion performed by the numeric conversion unit.

Numeric conversion performed by the numeric conversion unit may be processing for normalizing the time-series data.

Numeric conversion performed by the numeric conversion unit may be processing for differentiating the time-series data.

The state determination device may further include a conversion table storage unit in which a content of numeric conversion for each data type of the time-series data is defined. The numeric conversion unit may refer to the conversion table storage unit so as to determine a content of numeric conversion which is performed for each data type of the time-series data.

The learning unit may perform at least one machine learning among supervised learning, unsupervised learning, and reinforcement learning.

The estimation unit may estimate an abnormality degree related to an operation state of the injection molding machine, and the state determination device may display a warning message on a display device when an abnormality degree estimated by the estimation unit exceeds a predetermined threshold value.

The estimation unit may estimate an abnormality degree related to an operation state of the injection molding machine, and the state determination device may display a warning icon on a display device when an abnormality degree estimated by the estimation unit exceeds a predetermined threshold value.

The estimation unit may estimate an abnormality degree related to an operation state of the injection molding machine, and the state determination device may output at least one of a command for stopping or slowing down an operation of the injection molding machine and a command for limiting a torque of a power engine when an abnormality degree estimated by the estimation unit exceeds a predetermined threshold value.

The data acquisition unit may acquire data related to each of a plurality of injection molding machines which are mutually connected via a wired/wireless network, from the plurality of injection molding machines.

A state determination method according to still another aspect of the present invention includes: a data acquisition step for acquiring data related to the injection molding machine; a numeric conversion step for performing numeric conversion for extracting a feature in a temporal direction or an amplitude direction, with respect to time-series data of physical quantity included in data which is related to the injection molding machine and is acquired in the data acquisition step; and a learning step for performing machine learning using data, which is obtained through numeric conversion performed in the numeric conversion step, and generating a learning model.

A state determination method according to yet another aspect of the present invention includes: a data acquisition step for acquiring data related to the injection molding machine; a numeric conversion step for performing numeric conversion for extracting a feature in a temporal direction or an amplitude direction, with respect to time-series data of physical quantity included in data which is related to the injection molding machine and is acquired in the data acquisition step; and an estimation step for estimating a state of the injection molding machine based on data obtained through numeric conversion performed in the numeric conversion step, by using a learning model obtained by performing machine learning with respect to time-series data of physical quantity included in data related to the injection molding machine, on the basis of data obtained by extracting a feature in a temporal direction or an amplitude direction.

According to the present invention, data acquired in learning and estimation is subjected to numeric conversion by normalization or differentiation, for example, and learning or estimation is performed without collecting and machine-learning learning data of various types of injection molding machines. Accordingly, various states of injection molding machines can be estimated without requiring large cost in machine learning.

BRIEF DESCRIPTION OF THE DRAWINGS

FIG. 4 illustrates an example of numeric conversion based on differentiation.

FIG. 6 illustrates a display example for an abnormal state.

FIG. 8 illustrates an example of a conversion table.

DETAILED DESCRIPTION OF THE PREFERRED EMBODIMENTS

Figure 1:
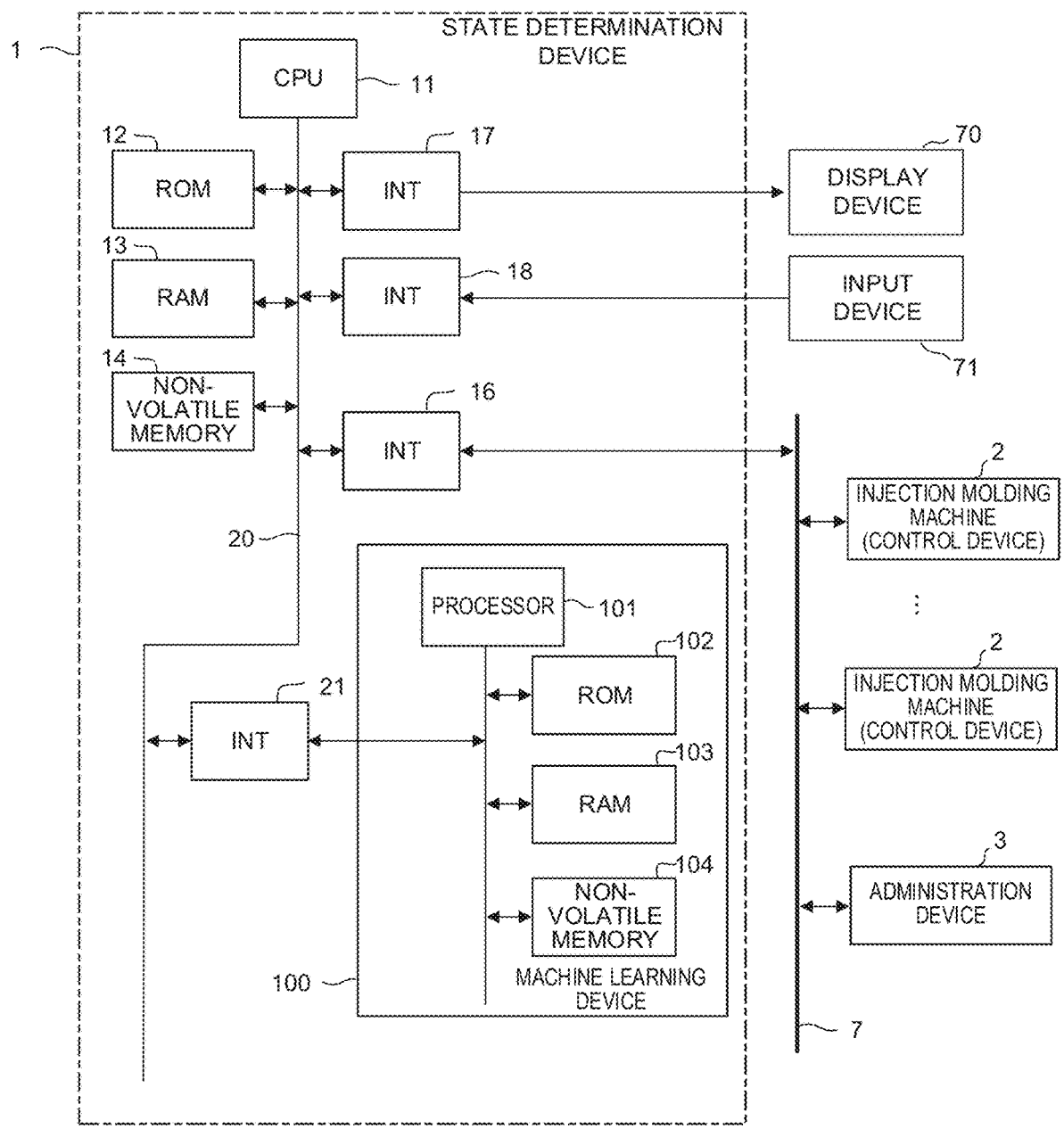
FIG. 1 is a schematic hardware configuration diagram illustrating a state determination device according to an embodiment.

FIG. 1 is a schematic hardware configuration diagram illustrating chief parts of a state determination device including a machine learning device according to an embodiment.

A state determination device 1 according to the present embodiment can be mounted on a controller that controls an injection molding machine, for example. Further, the state determination device 1 can be mounted as a personal computer which is installed with a controller that controls an injection molding machine, an administration device 3 which is connected with the controller via a wired/wireless network, or a computer such as an edge computer, a cell computer, a host computer, and a cloud server. The present embodiment provides a description of an example in which the state determination device 1 is mounted as a personal computer which is installed with a controller that controls an injection molding machine.

A CPU 11 included in the state determination device 1 according to the present embodiment is a processor for entirely controlling the state determination device 1. The CPU 11 reads out a system program stored in a ROM 12 via a bus 20 and controls the whole of the state determination device 1 in accordance with the system program. In a RAM 13, transient calculation data, various types of data which are inputted by an operator via an input device 71, and the like are temporarily stored.

A non-volatile memory 14 is composed of a memory, a solid state drive (SSD), or the like which is backed up by a battery (not illustrated), for example, and thus a storage state thereof is maintained even when the state determination device 1 is turned off. The non-volatile memory 14 stores a setting region in which setting information related to an operation of the state determination device 1 is stored, data inputted from the input device 71, various types of data acquired from an injection molding machine 2 (a type of machine, the mass and a material of a die, and a kind of resin, for example), time-series data of various types of physical quantity (a temperature of a nozzle; a position, a speed, an acceleration, a current, a voltage, and a torque of a power engine that drives the nozzle; a temperature of a die; and a flow rate, a flow velocity, and pressure of resin, for example) detected in a molding operation by the injection molding machine 2, data read via an external storage device (not illustrated) and a network, and the like. Programs and various types of data stored in the non-volatile memory 14 may be loaded into the RAM 13 when the programs and the data are executed or used. In the ROM 12, a known analysis program for analyzing various types of data, and a system program including, for example, a program for controlling communication with a machine learning device 100 which will be described later are preliminarily written.

The injection molding machine 2 is a machine for manufacturing a product molded with resin such as plastic, and melts resin, which is a material, and fills a die with the melted resin (injects the melted resin into the die) so as to mold the resin. The injection molding machine 2 is composed of various pieces of equipment such as a nozzle, a power engine (a motor, for example), a transmission mechanism, a reduction gear, and a movable unit and a state of each of the components is detected by a sensor or the like and an operation of each of the components is controlled by a controller. Examples of the power engine used in the injection molding machine 2 include an electric motor, a hydraulic cylinder, a hydraulic motor, and an air motor. Further, examples of the transmission mechanism used in the injection molding machine 2 include a ball screw, gears, pulleys, and belts.

Each piece of data read on a memory, data obtained as results of execution of programs or the like, data outputted from the machine learning device 100 which will be described later, and the like are outputted via an interface 17 to be displayed on a display device 70. Further, the input device 71 composed of a keyboard, a pointing device, or the like transfers a command, data, and the like based on an operation by an operator to the CPU 11 via an interface 18.

An interface 21 is an interface for connecting the state determination device 1 with the machine learning device 100. The machine learning device 100 includes a processor 101 for controlling the whole of the machine learning device 100, a ROM 102 which stores a system program and the like, a RAM 103 for performing temporary storage in each processing related to machine learning, and a non-volatile memory 104 used for storing learning models and the like.

The machine learning device 100 is capable of observing various types of information (various types of data such as a type of the injection molding machine 2, the mass and a material of a die, and a kind of resin; and time-series data of various types of physical quantity (such as a temperature of a nozzle; a position, a speed, an acceleration, a current, a voltage, and a torque of a power engine that drives the nozzle; a temperature of a die; and a flow rate, a flow velocity, and pressure of resin), for example) which can be acquired by the state determination device 1, via the interface 21. Further, the state determination device 1 acquires processing results outputted from the machine learning device 100 via the interface 21 and stores and displays the acquired results, and transmits the acquired results to other devices via a network or the like.

Figure 2:
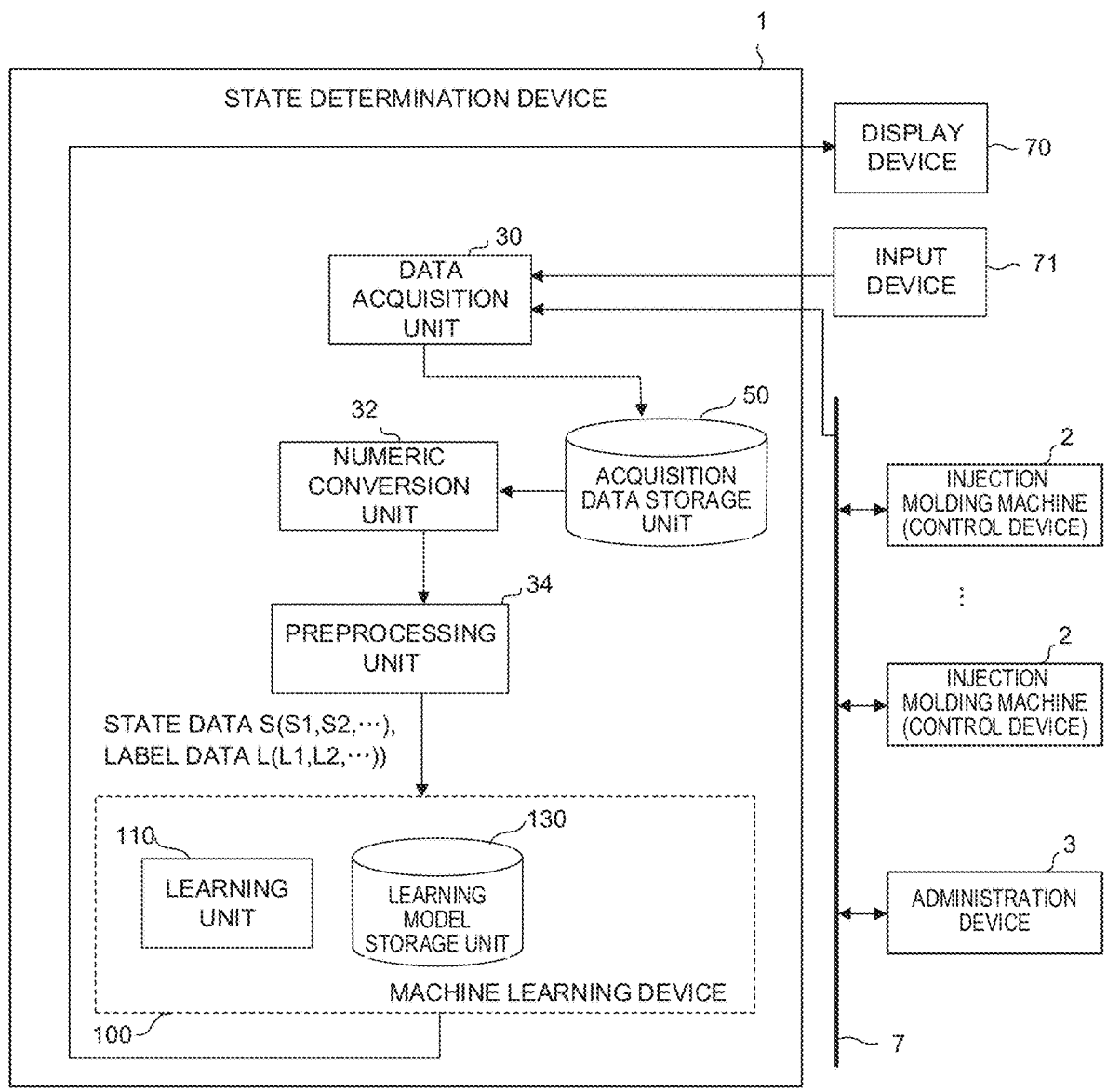
FIG. 2 is a schematic functional block diagram illustrating the state determination device according to a first embodiment.

FIG. 2 is a schematic functional block diagram illustrating the state determination device 1 and the machine learning device 100 according to a first embodiment.

The state determination device 1 according to the present embodiment includes components required for learning performed by the machine learning device 100 (learning mode). Functional blocks illustrated in FIG. 2 are realized when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes a data acquisition unit 30, a numeric conversion unit 32, and a preprocessing unit 34, and the machine learning device 100 included in the state determination device 1 includes a learning unit 110. Further, an acquisition data storage unit 50 which stores data acquired from external machines and the like is provided on the non-volatile memory 14. Furthermore, a learning model storage unit 130 which stores learning models constructed through machine learning performed by the learning unit 110 is provided on the non-volatile memory 104 of the machine learning device 100.

The data acquisition unit 30 acquires various types of data inputted from the injection molding machine 2, the input device 71, and the like. The data acquisition unit 30 acquires various types of data such as a type of the injection molding machine 2, the mass and a material of a die, and a kind of resin; time-series data of various types of physical quantity (such as a temperature of a nozzle; a position, a speed, an acceleration, a current, a voltage, and a torque of a power engine that drives the nozzle; a temperature of a die; and a flow rate, a flow velocity, and pressure of resin); and various types of data such as information related to a maintenance work for the injection molding machine 2 inputted by an operator, for example, and stores these pieces of data in the acquisition data storage unit 50. In acquisition of time-series data, the data acquisition unit 30 sets time-series data acquired in a predetermined temporal range (a range corresponding to one cycle of molding step, for example) as one time-series data based on change in signal data and other time-series data acquired from the injection molding machine 2 and stores the time-series data in the acquisition data storage unit 50. The data acquisition unit 30 may acquire data from the administration device 3 and other computers via an external storage device (not illustrated) or a wired/wireless network 7.

The numeric conversion unit 32 performs numeric conversion such as normalization and differentiation with respect to time-series data which is related to the injection molding machine 2 and included in acquisition data stored in the acquisition data storage unit 50. The numeric conversion unit 32 may uniform ranges which can be taken by values appearing in an amplitude direction in time-series data related to the injection molding machine 2, which are acquired by the data acquisition unit 30 and stored in the acquisition data storage unit 50, and create data obtained by extracting features related to value change appearing in the amplitude direction and the temporal direction.

Figure 3:
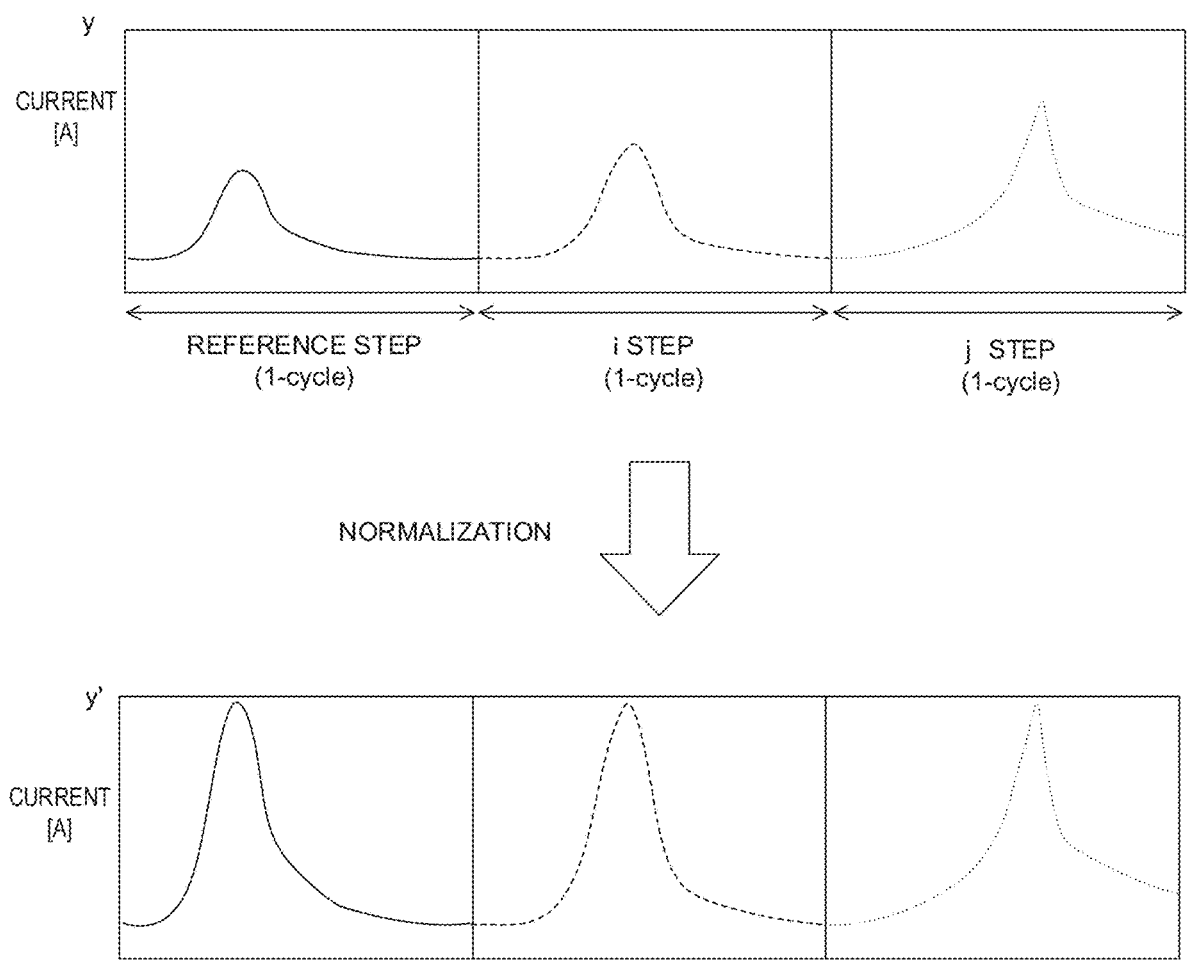
FIG. 3 illustrates an example of numeric conversion based on normalization.

Each graph shown in FIG. 3 illustrates change in a current value of a power engine which is detected when one cycle of molding step is performed in the injection molding machine 2. The graphs are arranged side by side to show three cycles (reference step, i step, and j step).

For time-series data in a predetermined temporal range acquired from an injection molding machine (for example, time-series data of a current value of a power engine), the numeric conversion unit 32 calculates a square mean value $y_{sms}$ by using Formula (1) below on reference time-series data $y_s$ when time-series data detected in the reference step is set as reference time-series data $y_s$ (data value sequence $y_{s1}, y_{s2}, \ldots, y_{sn}$), for example. Here, the reference character n denotes the number of data points of time-series data in a predetermined temporal range.

$$y_{sms} = \sqrt{\frac{1}{n}\sum_{i=0}^{n} y_{si}^2} \tag{1}$$

Then, the numeric conversion unit 32 calculates a value y' obtained by normalizing time-series data y in a predetermined temporal range (for example, the reference step, i step, j step) by using Formula (2) below based on the calculated square mean value $y_{sms}$ of the reference time-series data $y_s$.

$$y' = f(y) = \frac{y}{y_{sms}} \tag{2}$$

Here, the numeric conversion unit 32 may use an arithmetic mean, a weighted mean, a geometric mean, a harmonic mean, or the like instead of a value obtained by applying square mean to the reference time-series data $y_s$, in normalization thereby. Minimum values and maximum values of time-series data acquired in respective predetermined temporal ranges (respective cycles) can be uniformed through execution of such normalization, and accordingly, improvement in accuracy is expected in learning and estimation related to features in the amplitude direction and the temporal direction in time-series data of physical quantity detected in the molding step in each cycle.

The numeric conversion unit 32 may perform processing of differentiation or the like with respect to time-series data related to the injection molding machine 2, which are acquired by the data acquisition unit 30 to be stored in the acquisition data storage unit 50, so as to create data obtained by extracting features related to value change appearing in the amplitude direction and the temporal direction in the time-series data.

Each graph shown in FIG. 4 illustrates change in a current value of a power engine which is detected when one cycle of molding step is performed in the injection molding machine 2.

The numeric conversion unit 32 calculates a differential value y' by using Formula (3) below for time-series data y acquired from an injection molding machine (for example, time-series data of a current value of a power engine), for example.

$$y' = g(y) = \frac{dy}{dt} \tag{3}$$

Change in time-series data markedly appears in the data by performing such feature extraction using differential values, and accordingly, improvement in accuracy is expected in learning and estimation related to features of change in the amplitude direction and the temporal direction in time-series data of physical quantity which is detected in the molding step in each cycle.

The numeric conversion unit 32 may apply a numeric conversion method for extracting features in other temporal directions and amplitude directions to time-series data. Further, the numeric conversion unit 32 may combine a plurality of numeric conversion methods and apply the combined method to time-series data of physical quantity acquired from the injection molding machine 2 so as to extract features of the time-series data. For example, the numeric conversion unit 32 may differentiate time-series data by using Formula (3) and further normalize the differentiated data so as to set the resulting data as data to be used for machine learning performed by the machine learning device 100.

The preprocessing unit 34 creates state data to be used for learning performed by the machine learning device 100, based on data obtained by extracting features from time-series data by the numeric conversion unit 32. The preprocessing unit 34 creates state data obtained by converting (quantifying, sampling, for example) data inputted from the numeric conversion unit 32 into data having a unified format to be used in the machine learning device 100. For example, when the machine learning device 100 performs unsupervised learning, the preprocessing unit 34 creates state data S having a predetermined format in the unsupervised learning; when the machine learning device 100 performs supervised learning, the preprocessing unit 34 creates a set of state data S and label data L having a predetermined format in the supervised learning; and when the machine learning device 100 performs reinforcement learning, the preprocessing unit 34 creates a set of state data S and determination data D having a predetermined format in the reinforcement learning.

The learning unit 110 performs machine learning using state data which is created by the preprocessing unit 34 based on data obtained by extracting features from time-series data by the numeric conversion unit 32. The learning unit 110 generates learning models by performing machine learning using data acquired from the injection molding machine 2, with a known machine learning method such as unsupervised learning, supervised learning, and reinforcement learning and stores the generated learning models in the learning model storage unit 130. Examples of the unsupervised learning performed by the learning unit 110 include the autoencoder method and the k-means method. Examples of the supervised learning include the multilayer perceptron method, the recurrent neural network method, the long short-term memory method, and the convolutional neural network method. Examples of the reinforcement learning include the Q learning.

The learning unit 110 performs unsupervised learning based on state data which is obtained by converting acquisition data, which is acquired from the injection molding machine 2 which is in a normal operation state, by the numeric conversion unit 32 and the preprocessing unit 34 and thus, the learning unit 110 is capable of generating distribution of data acquired in a normal state as a learning model, for example. With the learning model thus generated, an estimation unit 120 which will be described later is capable of estimating how much state data which is obtained by converting acquisition data, which is acquired from the injection molding machine 2, by the numeric conversion unit 32 and the preprocessing unit 34 deviates from state data acquired in a normal operation state and thus calculating an abnormality degree as an estimation result.

Further, the learning unit 110 imparts a normal label to acquisition data acquired from the injection molding machine 2 which is in a normal operation state and, on the other hand, imparts an abnormal label to acquisition data acquired from the injection molding machine 2 before and after an abnormality has occurred, and performs supervised learning using state data which is obtained by converting acquisition data by the numeric conversion unit 32 and the preprocessing unit 34, being able to generate a discrimination boundary between normal data and abnormal data as a learning model, for example. With the learning model thus generated, the estimation unit 120 which will be described later inputs the state data which is obtained by converting acquisition data, which is acquired from the injection molding machine 2, by the numeric conversion unit 32 and the preprocessing unit 34 into a learning model so as to estimate whether the state data belongs to normal data or abnormal data and thus, the estimation unit 120 is capable of calculating a label value (normal/abnormal) as an estimation result and reliability of the label value.

In the state determination device 1 having the above-described configuration, the numeric conversion unit 32 performs normalization, differentiation, or the like with respect to acquisition data acquired from the injection molding machine 2 so as to extract predetermined features and the learning unit 110 performs learning by using the data in which the features are extracted. Thus, data used for learning by the learning unit 110 is based on data obtained by extracting predetermined features by the numeric conversion unit 32, so that a learning model created by the learning unit 110 enables highly accurate estimation with respect to extracted features.

Figure 5:
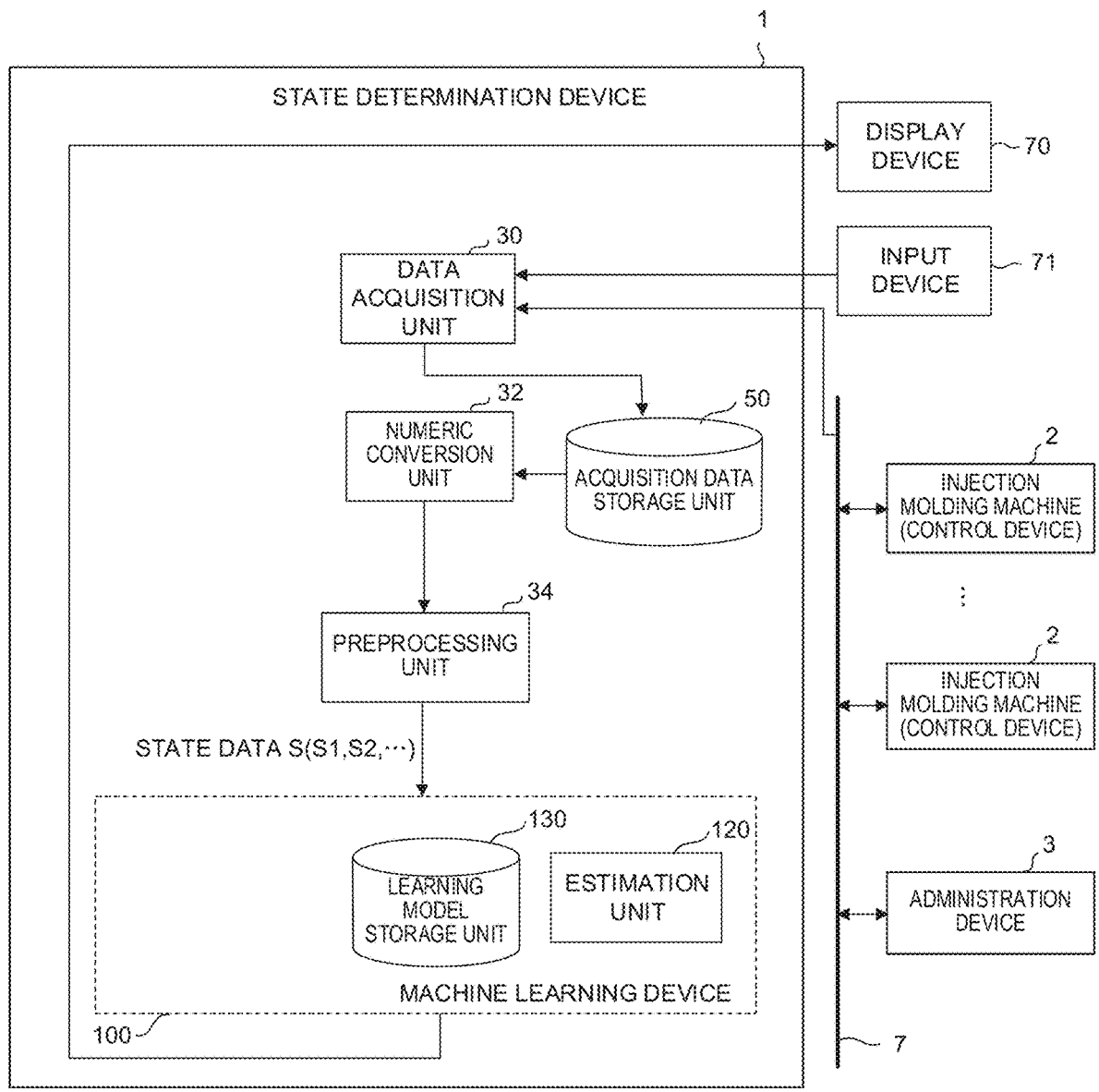
FIG. 5 is a schematic functional block diagram illustrating a state determination device according to a second embodiment.

FIG. 5 is a schematic functional block diagram illustrating the state determination device 1 and the machine learning device 100 according to a second embodiment.

The state determination device 1 according to the present embodiment has the configuration required for estimation performed by the machine learning device 100 (estimation mode). Functional blocks illustrated in FIG. 5 are implemented when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes the data acquisition unit 30, the numeric conversion unit 32, and the preprocessing unit 34, as is the case with the first embodiment. The machine learning device 100 included in the state determination device 1 includes the estimation unit 120. Further, the acquisition data storage unit 50 which stores data used for state estimation performed by the machine learning device 100 is provided on the non-volatile memory 14, and the learning model storage unit 130 which stores learning models constructed through machine learning performed by the learning unit 110 is provided on the non-volatile memory 104 of the machine learning device 100.

The data acquisition unit 30 and the numeric conversion unit 32 according to the present embodiment respectively have similar functions of the data acquisition unit 30 and the numeric conversion unit 32 according to the first embodiment.

The preprocessing unit 34 according to the present embodiment creates state data to be used for estimation performed by the machine learning device 100, based on data obtained by extracting the features by applying, by means of the numeric conversion unit 32, predetermined numeric conversion to acquisition data stored in the acquisition data storage unit 50. The preprocessing unit 34 creates state data obtained by converting (quantifying, sampling, for example) acquired data into data having a uniformed format to be used in the machine learning device 100. The preprocessing unit 34 creates state data S having a predetermined format in estimation performed by the machine learning device 100.

The estimation unit 120 estimates a state of an injection molding machine by using a learning model stored in the learning model storage unit 130 based on the state data S created by the preprocessing unit 34. In the estimation unit 120 according to the present embodiment, the state data S inputted from the preprocessing unit 34 is inputted into the learning model created (parameters are determined) by the learning unit 110 so as to estimate and calculate an abnormality degree related to a state of the injection molding machine and estimate and calculate a class (normal/abnormal, for example) to which an operation state of the injection molding machine belongs.

Results obtained through estimation by the estimation unit 120 (an abnormality degree related to a state of an injection molding machine and a class to which an operation state of the injection molding machine belongs, for example) may be displayed and outputted to the display device 70 and may be transmitted and outputted to a host computer, a cloud computer, and the like, via a wired/wireless network so as to be used. Further, when a result estimated by the estimation unit 120 is in a predetermined state (when an abnormality degree estimated by the estimation unit 120 exceeds a predetermined threshold value or when a class to which an operation state of an injection molding machine belongs and which is estimated by the estimation unit 120 is "abnormal", for example), the state determination device 1 may perform display output on the display device 70 with a warning message or an icon as illustrated in FIG. 6, for example, or may output a command for stopping or slowing down an operation, a command for limiting a torque of a power engine, or the like, to the injection molding machine.

In the state determination device 1 having the above-described configuration, the numeric conversion unit 32 performs normalization, differentiation, or the like with respect to acquisition data acquired from the injection molding machine 2 so as to extract predetermined features and the estimation unit 120 performs estimation of a state of the injection molding machine 2 by using the data in which the features are extracted. Learning models stored in the learning model storage unit 130 are used for performing estimation by the numeric conversion unit 32 based on data obtained by extracting predetermined features and highly accurate estimation can be performed with respect to extracted features. Accordingly, the estimation unit 120 can perform appropriate estimation processing.

Figure 7:
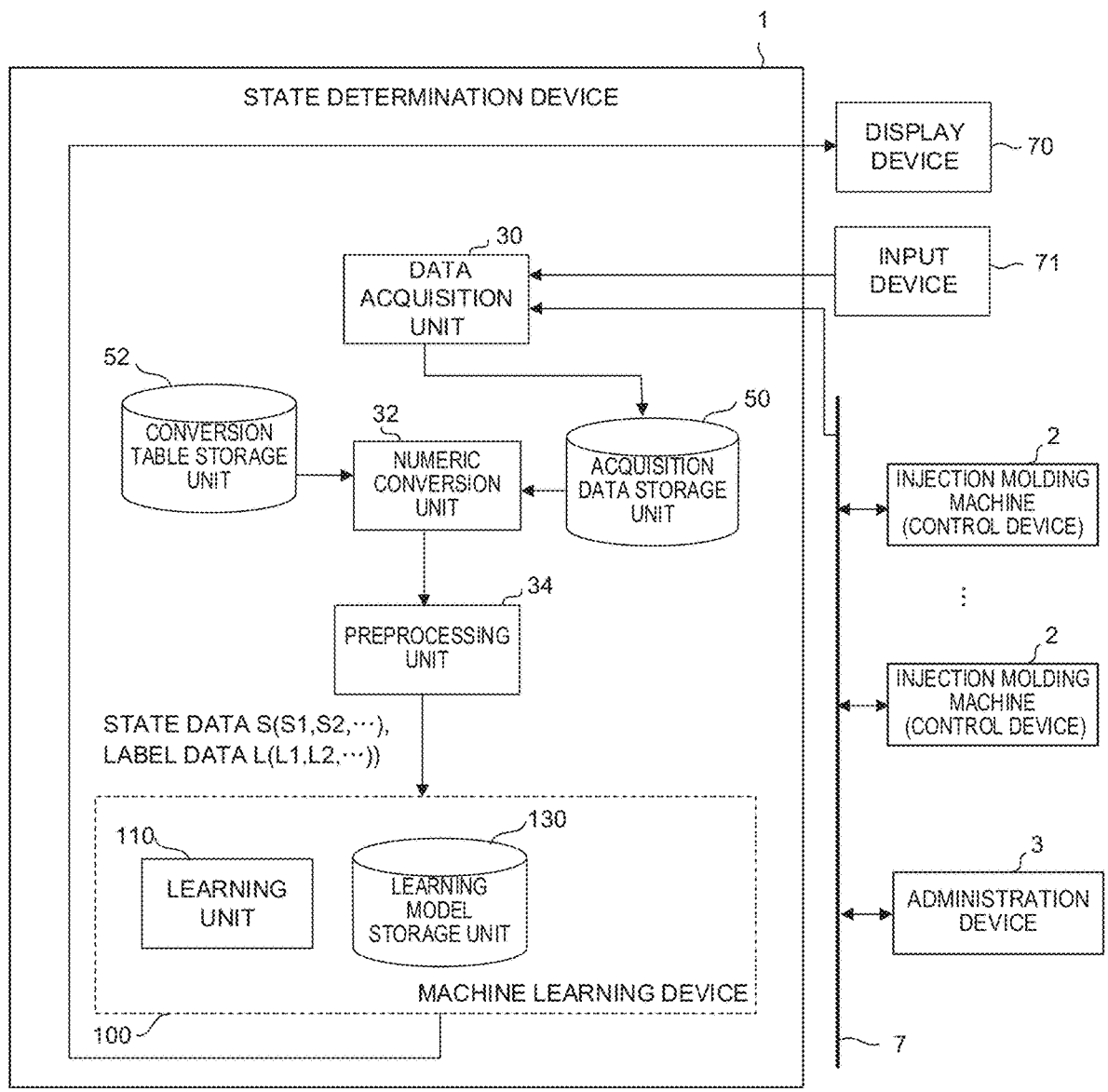
FIG. 7 is a schematic functional block diagram illustrating a state determination device according to a third embodiment.

FIG. 7 is a schematic functional block diagram illustrating the state determination device 1 and the machine learning device 100 according to a third embodiment.

The state determination device 1 according to the present embodiment includes components required for learning performed by the machine learning device 100 (learning mode). Functional blocks illustrated in FIG. 7 are implemented when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes the data acquisition unit 30, the numeric conversion unit 32, and the preprocessing unit 34, as is the case with the first embodiment. The machine learning device 100 included in the state determination device 1 includes the learning unit 110. Further, the acquisition data storage unit 50 which stores data acquired from external machines and the like and a conversion table storage unit 52 in which numeric conversion contents for respective data are defined are provided on the non-volatile memory 14. The learning model storage unit 130 which stores learning models constructed through machine learning performed by the learning unit 110 is provided on the non-volatile memory 104 of the machine learning device 100.

The conversion table storage unit 52 stores a conversion table in which whether or not numeric conversion is performed and what type of numeric conversion is applied when numeric conversion is performed are defined for every data type of the injection molding machine 2 acquired by the state determination device 1, as illustrated in FIG. 8. When the numeric conversion unit 32 according to the present embodiment converts time-series data of physical quantity of the injection molding machine 2 included in acquisition data stored in the acquisition data storage unit 50, the numeric conversion unit 32 refers to the conversion table storage unit 52 so as to determine which numeric conversion is applied (or whether or not numeric conversion is performed) to each data and apply the determined numeric conversion to the data.

In the state determination device 1 having the above-described configuration, by preliminarily defining numeric conversion methods to be applied to respective time-series data of physical quantity of the injection molding machine 2, which are included in acquisition data acquired from the injection molding machine 2, in a conversion table, appropriate numeric conversion can be flexibly applied in accordance with a data type of time-series data for physical quantity of the injection molding machine 2 and thus, improvement in accuracy is expected in learning by the machine learning device 100. Here, the conversion table storage unit 52 of the present embodiment may be applied to a state determination device in the estimation mode of the second embodiment described above to improve accuracy in estimation by the machine learning device 100 in a similar manner.

The embodiments according to the present invention have been described thus far. However, the present invention is not limited to the examples of the above-described embodiments and may be embodied in various aspects by appropriately adding alterations.

For example, the above embodiments provide the description in which the state determination device 1 and the machine learning device 100 are devices having mutually different CPUs (processors), but the machine learning device 100 may be implemented by the CPU 11 included in the state determination device 1 and the system program stored in the ROM 12. Further, when a plurality of injection molding machines 2 are connected with each other via a network, operation states of the injection molding machines 2 may be determined by only one state determination device 1, or the state determination device 1 may be mounted on a controller included in the injection molding machine 2.

The invention claimed is:

1. A state determination device that determines an operation state of an injection molding machine, the state determination device comprising a processor configured to:
   acquire data related to the injection molding machine;
   perform numeric conversion for extracting a feature in a temporal direction or an amplitude direction, with respect to time-series data of physical quantity included in the data related to the injection molding machine based on reference time-series data which is time-series data in a reference step; and
   perform machine learning using the data obtained through the performing of the numeric conversion, and generate a learning model,
   wherein the state determination device further comprises a non-transitory memory, the non-transitory memory is configured to store a conversion table in which a content of numeric conversion for each data type of the time-series data is defined, and the processor is configured to refer to the non-transitory memory so as to determine the content of numeric conversion performed for each data type of the time-series data.

2. A state determination device that determines an operation state of an injection molding machine, the state determination device comprising a processor and a non-transitory memory:
the processor is configured to
acquire data related to the injection molding machine;
perform numeric conversion for extracting a feature in a temporal direction or an amplitude direction, with respect to time-series data of physical quantity included in the data related to the injection molding machine based on reference time-series data which is time-series data in a reference step;
store a learning model in the non-transitory memory, wherein the learning model is obtained by performing machine learning with respect to the time-series data of physical quantity included in the data related to the injection molding machine, based on data obtained by the extracting of the feature in the temporal direction or the amplitude direction; and
perform estimation using the learning model stored in the-non-transitory memory, based on the data obtained through the numeric conversion,
wherein the non-transitory memory is configured to store a conversion table in which a content of numeric conversion for each data type of the time-series data is defined, and
the processor is configured to refer to the non-transitory memory so as to determine the content of numeric conversion performed for each data type of the time-series data.

3. The state determination device according to claim 1, wherein the numeric conversion comprises processing for normalizing the time-series data based on the reference time-series data which is the time-series data in the reference step.

4. The state determination device according to claim 1, wherein the numeric conversion comprises processing for differentiating the time-series data based on the reference time-series data which is the time-series data in the reference step.

5. The state determination device according to claim 1, wherein the processor is configured to perform at least one machine learning among supervised learning, unsupervised learning, and reinforcement learning.

6. The state determination device according to claim 2, wherein
the processor is configured to estimate an abnormality degree related to the operation state of the injection molding machine, and
the state determination device is configured to display a warning message on a display device in response to an abnormality degree estimated by the processor exceeding a predetermined threshold value.

7. The state determination device according to claim 2, wherein
the processor is configured to estimate an abnormality degree related to the operation state of the injection molding machine, and
the state determination device is configured to display a warning icon on a display device in response to an abnormality degree estimated by the processor exceeding a predetermined threshold value.

8. The state determination device according to claim 2, wherein
the processor is configured to estimate an abnormality degree related to the operation state of the injection molding machine, and the state determination device is configured to output at least one of a command for stopping or slowing down an operation of the injection molding machine and a command for limiting a torque of a power engine in response to an abnormality degree estimated by the processor exceeding a predetermined threshold value.

9. The state determination device according to claim 1, wherein the processor is configured to acquire data related to each of a plurality of injection molding machines which are mutually connected via a wired/wireless network, from the plurality of injection molding machines.

10. A state determination method of determining an operation state of an injection molding machine, the state determination method comprising:
acquiring data related to the injection molding machine based on reference time-series data which is time-series data in a reference step;
performing, using a processor, numeric conversion for extracting a feature in a temporal direction or an amplitude direction, with respect to time-series data of physical quantity included in the data related to the injection molding machine; and
performing machine learning using the data obtained through the performing of the numeric conversion, and generating a learning model,
wherein the state determination method further comprises:
storing a conversion table in which a content of numeric conversion for each data type of the time-series data is defined, and
referring to the conversion table so as to determine the content of numeric conversion performed for each data type of the time-series data.

11. A state determination method of determining an operation state of an injection molding machine, the state determination method comprising:
acquiring data related to the injection molding machine;
performing, using a processor, numeric conversion for extracting a feature in a temporal direction or an amplitude direction, with respect to time-series data of physical quantity included in the data related to the injection molding machine based on reference time-series data which is time-series data in a reference step; and
estimating a state of the injection molding machine based on the data obtained through the performing of the numeric conversion, by using a learning model obtained by performing machine learning with respect to the time-series data of physical quantity included in the data related to the injection molding machine on based on the data obtained by the extracting of the feature in the temporal direction or the amplitude direction,
wherein the state determination method further comprises:
storing a conversion table in which a content of numeric conversion for each data type of the time-series data is defined, and
referring to the conversion table so as to determine the content of numeric conversion performed for each data type of the time-series data.

* * * * *